(12) United States Patent
Hoffman et al.

(10) Patent No.: US 8,131,745 B1
(45) Date of Patent: Mar. 6, 2012

(54) ASSOCIATING USER IDENTITIES WITH DIFFERENT UNIQUE IDENTIFIERS

(75) Inventors: Auren Hoffman, San Francisco, CA (US); Jeremy Lizt, San Francisco, CA (US); Vivek Sodera, San Francisco, CA (US); Manish Shah, San Francisco, CA (US)

(73) Assignee: Rapleaf, Inc., San Francisco, CA (US)

( * ) Notice: Subject to any disclaimer, the term of this patent is extended or adjusted under 35 U.S.C. 154(b) by 404 days.

(21) Appl. No.: 12/099,748

(22) Filed: Apr. 8, 2008

Related U.S. Application Data

(60) Provisional application No. 60/910,795, filed on Apr. 9, 2007.

(51) Int. Cl.
*G06F 7/00* (2006.01)
*G06F 17/30* (2006.01)

(52) U.S. Cl. ........................................ 707/766; 707/784

(58) Field of Classification Search .......... 707/600–831; 709/206; 380/202, 241
See application file for complete search history.

(56) References Cited

U.S. PATENT DOCUMENTS 7,213,032 B2 * 5/2007 Mascarenhas ........................ 1/1
(Continued)

OTHER PUBLICATIONS

Janez Brank et al., Predictive Algorithms for Browser Support of Habitual User Activities on the Web, 2005, IEEE, 7 pages.*

*Primary Examiner* — Jean B Fleurantin
(74) *Attorney, Agent, or Firm* — Stolowitz Ford Cowger LLP

(57) ABSTRACT

A user correlation system uses aggregated data and matching/comparison in order to assign an association score that determines likelihood that unique identifiers are associated with the same user.

22 Claims, 9 Drawing Sheets

U.S. PATENT DOCUMENTS

| | | |
|---|---|---|
| 2002/0156895 A1 | 10/2002 | Brown |
| 2005/0267973 A1* | 12/2005 | Carlson et al. ............... 709/228 |
| 2007/0027930 A1 | 2/2007 | Alvarado et al. |
| 2007/0073888 A1* | 3/2007 | Madhok ...................... 709/227 |
| 2007/0143407 A1* | 6/2007 | Avritch et al. ................ 709/206 |
| 2008/0285464 A1* | 11/2008 | Katzir .......................... 370/241 |
| 2008/0288658 A1* | 11/2008 | Banga et al. .................. 709/245 |
| 2009/0168995 A1* | 7/2009 | Banga et al. .................... 380/28 |

* cited by examiner

| SOCIAL NETWORKS | DEEP SPIDER | COMMUNICATION | COMMERCE |
|---|---|---|---|
| PERSONAL PROFILE INFORMATION, PHOTOS, FRIENDS, USER NAME, ETC | INTERNET ACTIVITY, WEB FOOTPRINT | SKYPE, AIM, ADDRESS, PHONE NUMBERS, MULTIPLE EMAILS | AMAZON, WALMART, PRICELINE, RED ENVELOP, COMMUNICATION |
| PROPRIETARY DATA | GOVERNMENT DATA | PURCHASED | SHARED |
| | ELECTIONS, HOME OWNERSHIP, CENSUS, ETC. | PURCHASING HISTORY, MAGAZINE SUBSCRIPTIONS, ETC. | QUID PRO QUO FROM CUSTOMERS, IP ADRESSES, SHARED BLACKLISTS, ETC. |

FIG. 4A

ASSOCIATING USER IDENTITIES WITH DIFFERENT UNIQUE IDENTIFIERS

TECHNICAL FIELD

The present disclosure relates generally to correlating unique identifiers.

BACKGROUND

Most unique identifiers such as email addresses, website usernames, and even phone numbers, are issued to a single human. In the example of email addresses, minorities of the identifiers are issued for couples, families, or organizations where multiple individuals in that group access the same email address. The majority of email addresses are linked to only an individual. Further, one human often uses and controls several unique identifiers. For example, a person may use one email address for work and have a second home email address for personal use.

Websites may block users due to certain actions or violations. Blocking may be based on the violators' unique identifier used to sign-up and sign-in. However, the user can simply sign in to the website using a different unique identifier and continue the illicit actions or violations. These sites are thus forced to restrict activity for all users, create a more complicated sign up procedure, or capture and verify personal information. These website policing actions increase the difficulty of using and interacting with the website and thereby hurt the user experience for the rest of the users.

Most government and law enforcement officials currently do not require criminals and sex offenders to register their email addresses. Given the increase in sex offender and criminal activity at various websites, states such as Virginia are looking to require sex offenders to register their email address as well as other unique identifiers. New email addresses, however, can be easily created through free webmail services. Thus, the sex offender can continue illicit Internet activities without any monitoring or knowledge by the government agencies.

The foregoing examples of the related art and limitations related therewith are intended to be illustrative and not exclusive. Other limitations of the related art will become apparent to those of skill in the art upon a reading of the specification and a study of the drawings.

SUMMARY

A user correlation system uses aggregated data and matching/comparison in order to assign an association score that determines likelihood that unique identifiers are associated with the same user. The user correlation system aggregates data and then returns a score representing the confidence that multiple unique identifiers are associated to the same person.

The user correlation system gives business, government, and law enforcement officials the ability to associate multiple unique identifiers to a given person. The unique identifiers may then be linked to pertinent information such as name, US postal address, and social security number. With regards to law enforcement, the correlation system allows law enforcement agencies to more effectively identify illegal and forbidden activities and prevent wrongdoings or crimes.

The user correlation system may be used to evaluate the association of multiple unique identifiers in any applicable context. For example, more people are spending more time on the Internet. Background checks today often do not investigate the Internet related activities or Internet footprint history of the individual. The user correlation system can be used when generating trustworthiness or social credit scores for different individuals based on these Internet activities. This is analogous to credit scores distributed by financial institutions assessing individuals' credit risk. Because the user correlation system can identify multiple email addresses used by the same individual, the trustworthiness or social credit score more accurately represents the true reputation of the individual.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

The following description, several specific details are presented to provide a thorough understanding of embodiments. One skilled in the relevant art will recognize, however, that the embodiments can be practiced without one or more of the specific details, or in combination with other components, etc. In other instances, well-known implementations or operations are not shown or described in detail to avoid obscuring aspects of various embodiments, of the invention.

A unique identifier (UID) is an identifying component that is granted for a human to use, verified by that human, and unique such that there is only one identifier in existence in the space of online, internet activity. Such UIDs may include: email addresses, website usernames, instant messenger or chat screen names, telephone numbers, and blog and website URLs.

The UID may be recognized as personally identifiable information (PII), which is information that can potentially be used to identify, contact, or locate a single human. PII includes name, address, phone number, fax number, email address, financial profiles, medical profiles, social security number, and credit card information. Email address or phone while may not be explicitly PII, when grouped together with name or address can be recognized as PII. While PII may be used to identify, contact, or locate a single human, the purpose of a UID is distinguish a human from another human. Note that images, photos, audio recordings, and video recordings are not considered UIDs since they are not granted for use but rather self-developed, not verified, and can be duplicated; although, the images, photos, audio recordings, and video recordings may help in identifying UIDs.

Figure 1:
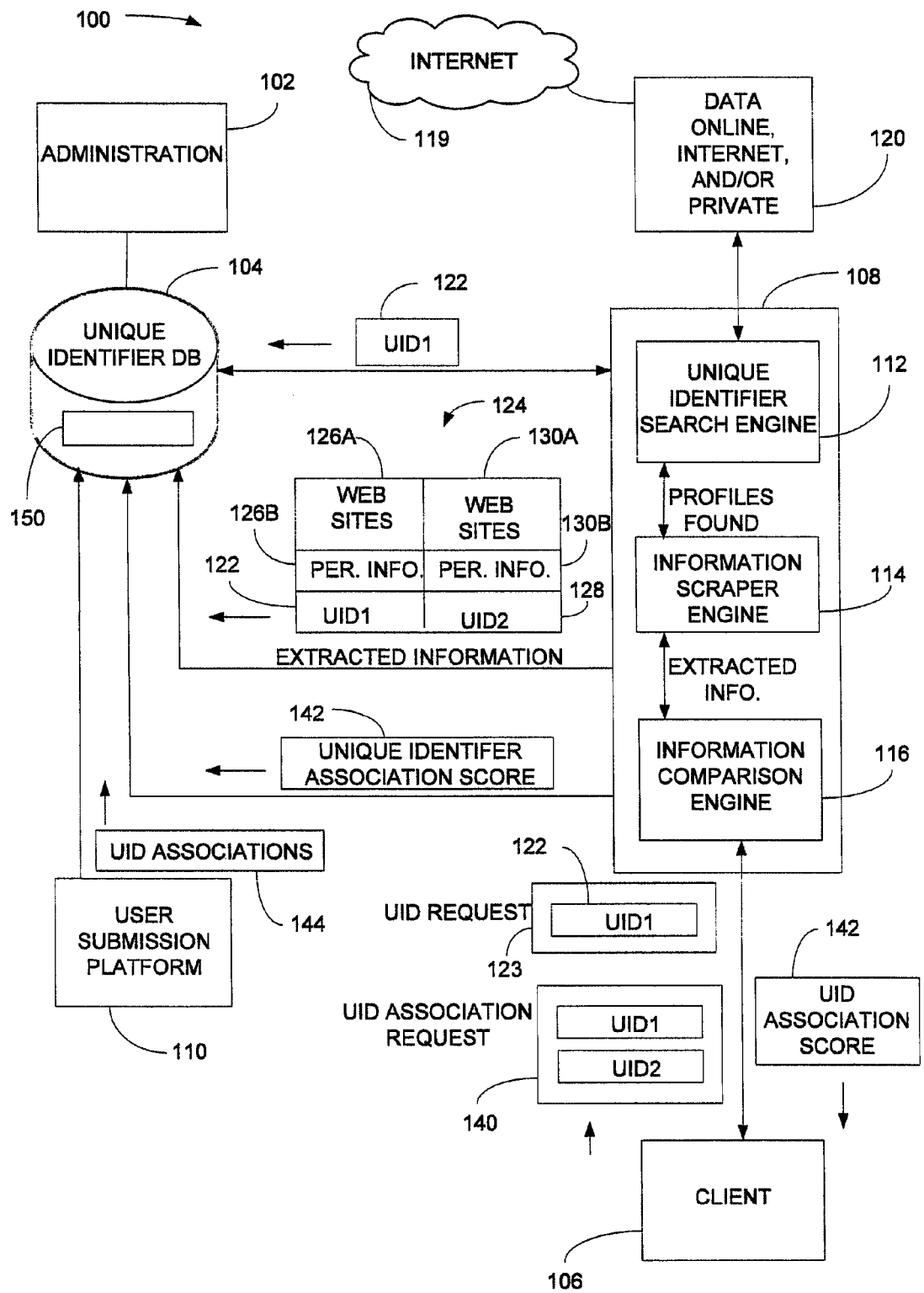
FIG. 1 shows an example user correlation system.

FIG. 1 depicts an example of a user correlation system 100 that generates unique identifier (UID) association scores between two or more UIDs. In the example of FIG. 1, the system 100 includes an admin 102, a UID database 104, a client 106, a server 108, user submission platform 110, and Internet, on-line, or any other type of data 120. The server 108 includes a UID search engine 112, an information scraper engine 114, and an information comparison engine 116. One or more of the admin 102, the UID database 104, and the client 106 could be logically or physically included in or local with respect to the server 108 or client 106, or could be located remotely in one or more other servers.

Figure 2:
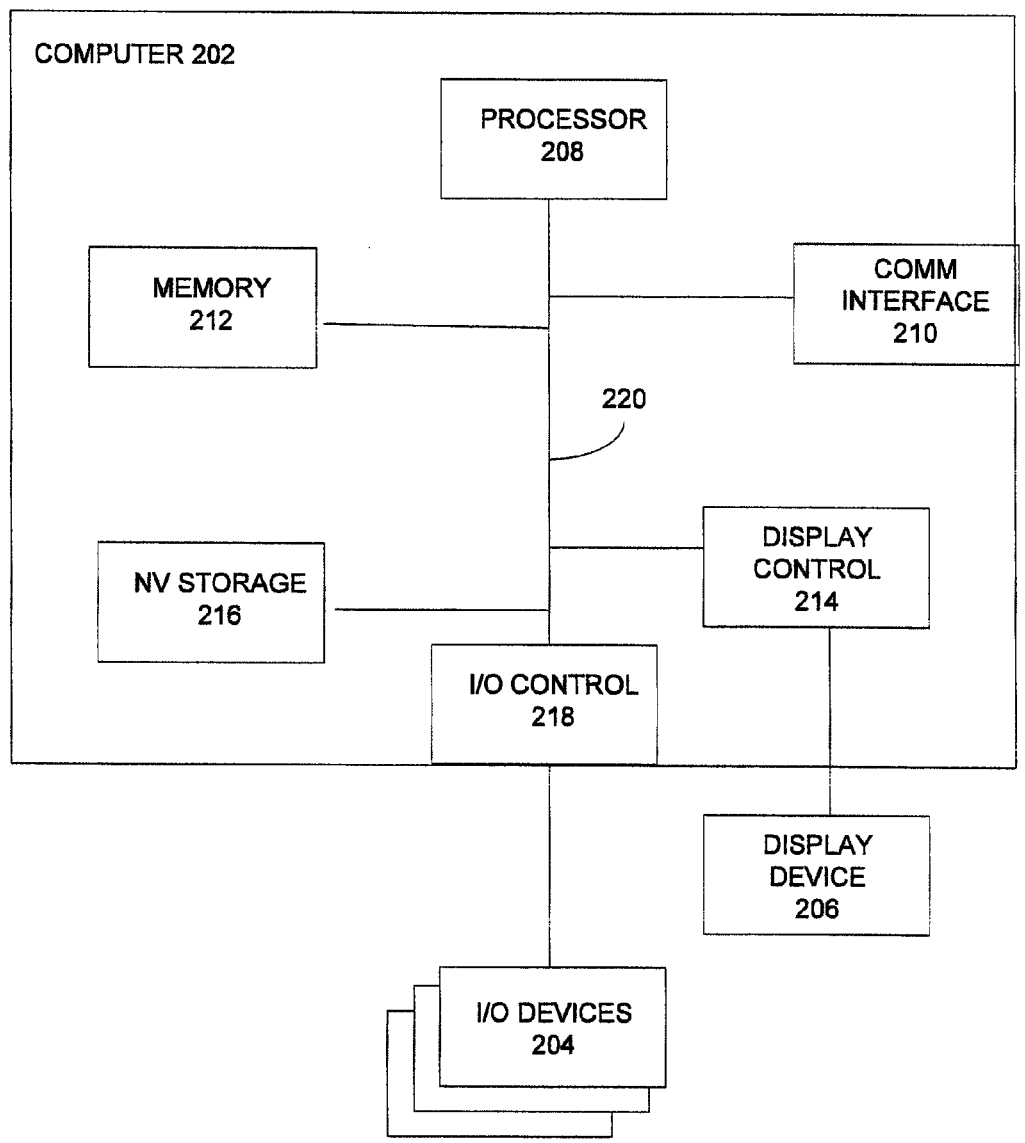
FIG. 2 shows an example computer system used with the system of FIG. 1

In the example of FIG. 1, the admin 102 may include a known or convenient computer system that is locally, remotely, or otherwise coupled to the UID database 104. FIG. 2, described later, depicts a computer system suitable for implementation of the admin 102. The admin 102 gives administrators of user correlation system 100, direct intervention of said user correlation system 100.

In the example of FIG. 1, the UID database 104 catalogs data associated with UIDs, in particular what websites the UID is registered under as well as demographic, psychographic, social web footprint, and social network connections information among other information. In UID database 104, each record 150 in the data can be categorized randomly or alphabetically.

The social network connections information in records 150 can be data on the friends or connections for a particular individual. This data can be stored as a friend map within UID database 104 and be captured from websites that have social networking components, among other various sources that may or may not exist at the moment. This data may singlehandedly become instrumental in linking UIDs.

As an example of how the social network connections in records 150 can be used, the overlap in friends from two separate profiles on two different websites is assessed. Based on the assessment and derived friend map, a determination can be made with confidence whether two profiles of two separate websites are linked together. Knowing the UIDs associated with those two profiles, allows a confidence value to be assigned that indicates the confidence that the two UIDs are linked together to the same individual.

Every UID is going to have certain properties and will distribute characteristics in a particular way, thus there is no global generalization made for all UIDs. Advantageously, the UID database 104 facilitates cataloging the properties of each UID.

In the example of FIG. 1, the client 106 may include a known or convenient computer system that is locally, remotely, or otherwise coupled to the server 108. FIG. 2 described later, depicts a computer system suitable for implementation of the client 106 and/or the server 108.

The client 106 may be used to submit a UID request 123 to the user correlation system 100. The UID request 123 is used by the unique identifier search engine 112 to identify any associated information in Internet network 119, on-line, or other data 120. The information 124 extracted from the data 120 can be anything that may associate a particular UID 122 (UID1) in UID request 123 with a particular human being.

For example, data 120 can be any information accessed over the Internet 119, any other Internet related data, or other data source such as information collected from website profiles, blog comments, forums, or anywhere else an email address, email signatures, email headings, etc. that may leave a trace of access by the unique identifier 122.

The data 120 in some applications may not necessarily be just on-line data or data from the Internet 119. Data 120 may also include any other type of publicly accessible or private information, whether online or offline, that the user correlation system may use to determine if UIDs are associated with the same user. For example, the data 120 may also include confidential law enforcement information in a database where the UID search engine 112 is granted special access. Other restricted access enterprise databases, files, or any other information may also be used separately or in combination with other publicly or privately accessed on-line or Internet data.

For example, the information 124 obtained from data 120 may include pictures, alias names, home or work address, phone numbers, contacts, memberships in websites, accessed URLs, friend lists, or any other information or Internet activities that may be associated with a particular human being. Some techniques used for extracting information from websites associated with a particular email address are known and therefore not described in further detail.

In this example, the information 124 may include website information 126A and personal information 126B associated with UID1. In addition, the UID search engine 112 may extract other UIDs 128 (UID2) associated with UID1. For example, UID2 may have other web site information 130A and personal information 130B similar to the website information 126A and personal information 126B associated with UID1. The client 106 makes use of the data 124 sent to the UID database 104 to assess the UID association between different UIDs. Accordingly, the client 106 can send a UID association request 140 to the server 108. For the purpose of example, the UID1 may correspond to the email address bill.johnson@gmail.com and UID2 may correspond to the instant messaging (IM) name "billjohnson". The information 124 may also identify a particular IM service associated with the UID. For example there may be a "billjohnson" on AIM and a "billjohnson" on Yahoo IM.

A submission platform 110 allows users to voluntarily associate different UIDs with each other. For example, a user of platform 110 can associate a user, such as "Bill Johnson", with Bill@companyA.com and BJohnson@gmail.com. The motivation for a user to do this via user submission platform 110 may be to increase an associated online reputation as well as an accurate portrayal of one's online persona to their offline persona. For example, a user may volunteer different alias email addresses that are all associated with the same user. Along this example, the user may list three different email addresses on three different email servers that the user is currently using. This email address information allows the user correlation system 100 to obtain more reference information for that user. In other words, the user correlation system 100 now has more reference information for tracking down and confirming all of the Internet activities of that user. As an example of this application, if the user correlation system 100 confirms that all of the addresses voluntarily supplied by the user have all been used in a reputable manner, the overall online reputation score for that user may be assigned a higher reputation value.

Client 106 as described above operates as a client/customer that may ping the user correlation system 100 directly say through an application program interface (API), etc., to determine if two email addresses are linked to the same person. These two email addresses—UIDs—may be a consumer of the enterprise operating user correlation system 100.

The UID search engine 112 searches data 120 or information already in database 104 for any profile or other information associated with a given UID. If no profile or information is found, data for that particular UID is recorded in database 104 as "null". If profile or information 124 is found for a given UID1, this data is captured by information scraper engine 114 and then cataloged in the UID database 104. The above procedure repeats for the second UID2. The information comparison engine 116 compares the data 124 obtained from information scraper 114 for both UID1 and UID2 and returns a UID association score 142 that is sent to the client 106 as well as the UID database 104.

The information comparison engine 116 determines whether the UID association score is adequate for a particular purpose. For example, the client 106 may receive a UID association score of 97% from comparison engine 116 that provides a level of confidence that UID1 and UID2 are associated with the same human. With a permissible UID association preset at 95%, this indicates that UID1 and UID2 are linked together and associated with a same unique human. The remaining scores may be disbursed amongst other possible matches.

A public user can explicitly and voluntarily associate multiple UIDs via submission platform 110. For example, UID associations 144 may explicitly identify pieces of information, such as different email addresses, that are associated with the same human. This submitted information 144 is then recorded in UID database 104. The user submission platform 110 allows humans to verify particular UIDs, thereby increasing the UID association score.

The user correlation system 100 also has the capability to learn and naturally evolve as more data (corresponding to various UIDs) is analyzed. This evolution may include learning which subsets of data to analyze rather than analyzing every bit of information. The aim of this evolution is to perform and capture equivalent, valuable information efficiently while reducing the burden on resources.

For example, the user correlation system 100 may determine over time that certain common pieces of information, such as a common phone number or address, are commonly associated with high UID association scores. Accordingly, the user correlation system 100 may apply a higher weight to these types of common information for subsequent UID association scores.

The user correlation system 100 can facilitate assessment of UID associations as described above. In one embodiment, the UID association score 142 can, in turn, be used to assess the UID association of two or more UIDs. For example, a manager can determine that the association of the UIDs Bill.Johnson@gmail.com and Johnson@companyA.com are deserving of an association score that is different than that calculated by information comparison engine 116. In such an embodiment, it may be desirable to include an additional UID association database that includes association scores between various UIDs. This second UID association database may or may not be logically or physically included in the UID database 104.

FIG. 2 depicts a computer system 200 suitable for implementation of the admin 102, the client 106, database 104, user submission platform 110, and/or the server 108. The computer system 200 includes a computer 202, I/O devices 204, and a display device 206. The computer 202 includes a processor 208, a communications interface 210, memory 212, display controller 214, non-volatile storage 216, and I/O controller 218. The computer 202 may be coupled to or include the I/O devices 204 and display device 206.

The computer 202 interfaces to external systems through the communications interface 210, which may include a modem or network interface. The communications interface 210 can be considered to be part of the computer system 200 or a part of the computer 202. The communications interface 210 can be an analog modem, ISDN modem, cable modem, token ring interface, satellite transmission interface (e.g. "direct PC"), or other interfaces for coupling a computer system to other computer systems. Although conventional computers typically include a communications interface of some type, it is possible to create a computer that does not include one, thereby making the communications interface 210 optional in the strictest sense of the word.

The processor 208 may include, by way of example but not limitation, a conventional microprocessor. While the processor 208 is a critical component of all conventional computers, any applicable known or convenient processor could be used for the purposes of implementing the techniques described herein. The memory 212 is coupled to the processor 208 by a bus 220. The memory 212, which may be referred to as "primary memory" can include Dynamic Random Access Memory (DRAM) and can also include Static RAM (SRAM). The bus 220 couples the processor 208 to the memory 212, and also to the non-volatile (NV) storage 216, to the display controller 214, and to the I/O controller 218.

The I/O devices 204 can include a keyboard, disk drives, printers, a scanner, and other input and output devices, including a mouse or other pointing device. For illustrative purposes, at least one of the I/O devices is assumed to be a block-based media device, such as a DVD player. The display controller 214 may control, in a known or convenient manner, a display on the display device 206, which can be, for example, a cathode ray tube (CRT) or liquid crystal display (LCD).

The display controller 214 and I/O controller 218 may include device drivers. A device driver is a specific type of computer software developed to allow interaction with hardware devices. Typically this constitutes an interface for communicating with the device, through a bus or communications subsystem that the hardware is connected to, providing commands to and/or receiving data from the device, and on the other end, the requisite interfaces to the OS and software applications.

The device driver may include a hardware-dependent computer program that is also OS-specific. The computer program enables another program, typically an OS or applications software package or computer program running under the OS kernel, to interact transparently with a hardware device, and usually provides the requisite interrupt handling necessary for any necessary asynchronous time-dependent hardware interfacing needs.

The non-volatile storage 216, which may be referred to as "secondary memory," is often a magnetic hard disk, an optical disk, or another form of storage for large amounts of data. Some of this data is often written, by a direct memory access process, into memory 212 during execution of software in the computer 202. The non-volatile storage 216 may include a block-based media device. The terms "machine-readable medium" or "computer-readable medium" include any known or convenient storage device that is accessible by the processor 208 and also encompasses a carrier wave that encodes a data signal.

The computer system 200 is one example of many possible computer systems which have different architectures. For example, personal computers based on an Intel microprocessor often have multiple buses, one of which can be an I/O bus for the peripherals and one that directly connects the processor 208 and the memory 212 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 212 for execution by the processor 208. A Web TV system, which is known in the art, is also considered to be a computer system, but it may lack some of the features shown in FIG. 2, such as certain input or output devices. A typical computer system will usually include at least a processor, memory, and a bus coupling the memory to the processor.

The computer system 200 may be controlled by an operating system (OS). An OS is a software program used on most, but not all, computer systems that manage the hardware and software resources of a computer. Typically, the OS performs basic tasks such as controlling and allocating memory, prioritizing system requests, controlling input and output devices, facilitating networking, and managing files. Examples of operating systems for personal computers include Microsoft Windows®, Linux, and Mac OS®. Delineating between the OS and application software is sometimes rather difficult. Fortunately, delineation is not necessary to understand the techniques described herein, since any reasonable delineation should suffice.

The lowest level of an OS may be its kernel. The kernel is typically the first layer of software loaded into memory when a system boots or starts up. The kernel provides access to various common core services to other system and application programs.

As used herein algorithmic descriptions and symbolic representations of operations on data bits within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

An apparatus for performing techniques described herein may be specially constructed for the required purposes, or it may comprise a general purpose computer selectively activated or reconfigured by a computer program stored in the computer. Such a computer program may be stored in a computer readable storage medium, such as, by way of example but not limitation, read-only memories (ROMs), RAMs, EPROMs, EEPROMs, magnetic or optical cards, any type of disk including floppy disks, optical disks, CD-ROMs, DVDs, and magnetic-optical disks, or any known or convenient type of media suitable for storing electronic instructions.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-In-Time (JIT) compiled from bytecode (e.g., Java). Any known or convenient computer, regardless of architecture, should be capable of executing machine code compiled or otherwise assembled from any language into machine code that is compatible with the computer's architecture.

Figure 3:
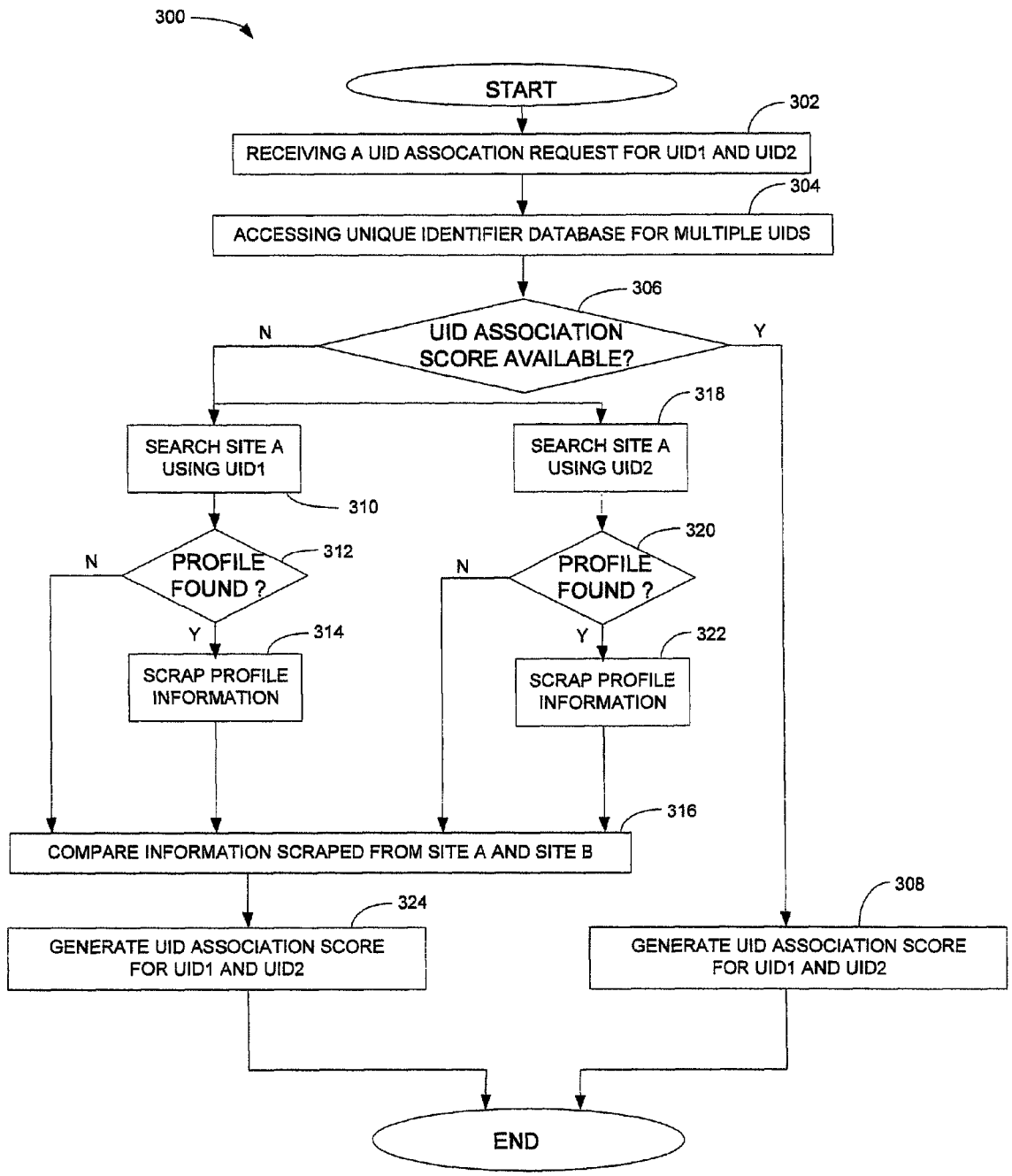
FIG. 3 is an example flowchart for actively assessing UID association scores.

FIG. 3 is an example flowchart 300 for assessing the UID association. The modules of the flowchart 300 may be reordered, or arranged for serial or parallel execution as appropriate. In the example of FIG. 3, the flowchart 300 begins at module 302 where a UID association request for two or more UIDs is received. The UID association request includes a pair of UIDs.

In the example of FIG. 3, the flowchart 300 continues to module 304 where a UID database or on-line data are accessed for the multiple UIDs. The flowchart 300 continues to decision point 306 where it is determined whether a UID association is already available for the UID pair. If it is determined that a UID association score exists for the UID pair (306-Y), the flowchart 300 continues to module 308 where the UID association score is sent in response to the UID association request.

Additional information may be sent with, or instead of, the UID association score, such as specific information collected and catalogued in the UID database. If a UID association score is not available for the UID pair (306-N), the flowchart 300 continues to module 310 where UID1 is searched at site A. Again, site A can be one or more websites on Internet 120 (FIG. 1) and/or information from the UID database that may contain information associated with the UID1.

The flowchart 300 continues to decision point 312 where it is determined if a profile is found or available to collect information. If no profile is found (312-N), the flowchart 300 bypasses the flow until reaching module 316. The "lack of profile" information is stored at module 316.

If a profile is found (312-Y), the flowchart 300 continues to module 314 where the information scraper engine collects profile information from the particular site. After information is collected from a profile, the information is stored within the information comparison engine at module 316.

The flowchart 300 continues in module 318 where UID2 is searched at Site B. Site B can be any website in data 120 or information in UID database 104 associated with UID2. The flowchart 300 continues to decision point 320 to check for a profile registered under the particular UID. If no profile is found (316-N) the "lack of a profile" information is stored in the information comparison engine at module 316. If a profile is found (320-Y), flowchart 300 continues to module 322 where the information scraper engine collects profile information from the particular site. The flowchart 300 then continues to module 316 where the profile information from Sites A and B corresponding to UID1 and UID2 respectively, are compared.

Using the UID matching/comparison schemes in place within the information comparison engine 116 (FIG. 1), the flowchart is taken to module 324, where a UID association score is generated for UID1 and UID2. After the UID association assessment request 140 has been responded to and other actions taken, if appropriate, the flowchart 300 ends.

FIG. 4A shows examples of data that may be used to correlate UIDs with a same person. Social network information may include personal profile information, photos, information regarding common friends, user names etc. Deep spider information may include internet activities and web foot prints. Communication information may include Skype, AIM, address, phone numbers, and multiple email information. Commerce data may include information obtained from on-line or other retailers. Proprietary data may include information obtained from the operator of the user correlation system 100 or from other private information services. Government data may include election, home ownership and census information. Purchased data may include information regarding the purchasing history, magazine subscriptions, etc. Finally, shared data may include information provided by users of the correlation system, such as IP addresses, shared blacklists, etc.

Active and Passive User Correlation

The examples described below show how the user correlation system either actively or passively determines different user confidence values. These are examples, and other techniques could also be used for identifying different UIDs associated with the same person.

Figure 4:
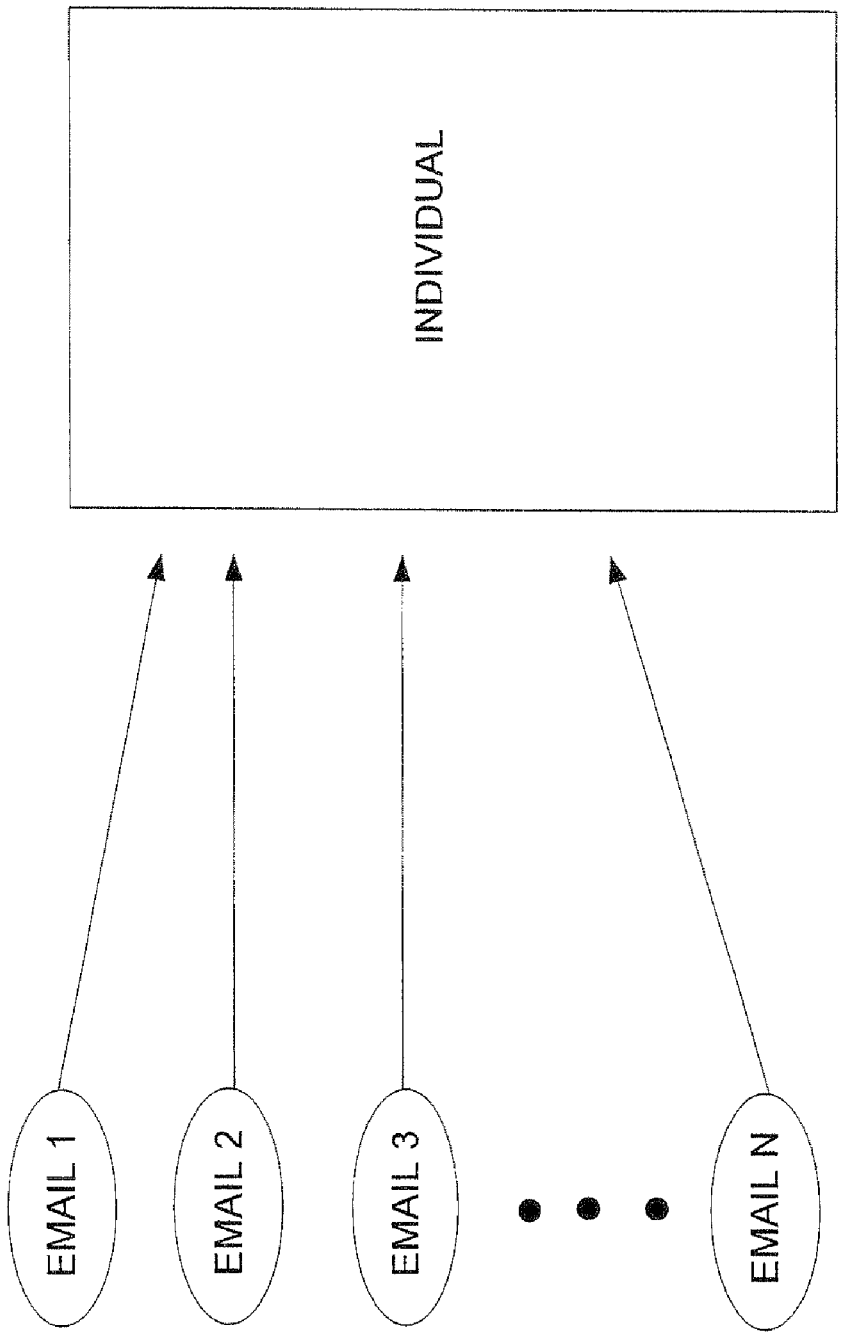
FIG. 4A shows example data sources for user correlation information.
FIG. 4B shows how multiple email addresses are associated with a same individual.

FIG. 4B shows that most UIDs, especially email addresses, have a many-to-one relationship to an individual. Most unique identifiers (UID) such as email addresses, website usernames, and even phone numbers, are issued to a single individual. In the example of email addresses as shown in FIG. 4, a minority of these are issued to couples (i.e. Boband-Susie@_____), families (SmithFamily@_____), or organizations (sales@_____), whereas the majority of email addresses are linked to an individual. For this majority, there can be a many-to-one relationship where one person has several UIDs but each UID has only one person that can use it.

Figure 5:
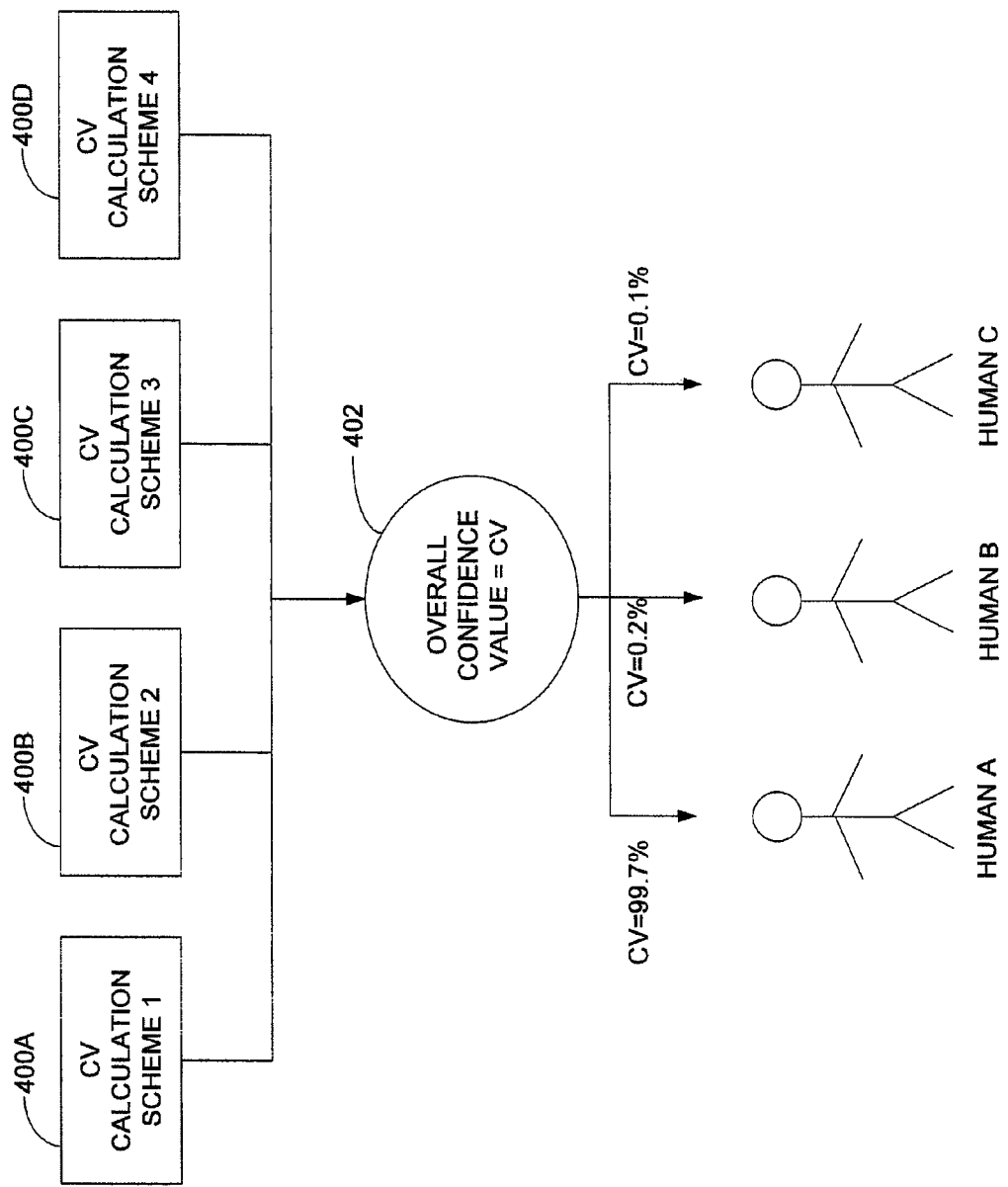
FIG. 5 shows how an overall confidence score is assigned to different human beings.

FIG. 5 breaks down different confidence value (CV) calculation schemes 400A-400D that contribute to the calculation of an overall CV 402. Enough data is aggregated to assign a confidence value that represents the likelihood that 2 or more UIDs are linked to the same human being. The CV 402 can be percentage, value/numeric, letter based, or any other type of representation including color, shape, graphical, or sound. For instance, if it is known with the utmost confidence that the same human (Human A) is behind the bill.johnson@gmail.com and AIM username "billjohnson", then a 99.7% CV can be assigned indicating a high likelihood that these two UIDs are used by, and therefore link to, the same individual (Human A).

The remaining CV is spread amongst other possible matches. In this example, the majority of the confidence value 402 is assigned to Human A, thus it can be assumed with utmost confidence that 2 or more unique identifiers are mapped to Human A. Conversely Human C has the least likely chance to be associated with the same 2 or more unique identifiers.

The overlying scheme of connecting multiple UIDs to the same individual comprise the four CV calculation sub-schemes 400A-400D shown in FIG. 5. Each sub-scheme 400A-400D weighs differently in providing an overall CV 402. Also, each sub-scheme 400A-400D may have more than one mechanism that contributes to its corresponding CV.

CV Calculation Scheme 400A

CV calculation scheme 400A analyzes components of the UID itself.

Mechanism 1

A first mechanism understands variations in email user and domain names. Certain email addresses can have multiple variations but still adhere to the same email account. This applies to variations in the username of an email address, as it is at smaller organizations where most employees who are "[firstname].[lastname]@domain.ext" are also "[firstinitial][lastname]@domain.ext".

Organizations may also provide domain names with various domain extensions that point to the same email account. An example of this:

[username]@company.com=[username]@mail.company.com=[username]@corpmail.company.com There can also be different domains associated with the same email account:

[username]@aol.com=[username]@aim.com

[username]@gmail.com=[username]@googlemail.com

A mapping system is used to understand relationships within and between email address domains. For example, first initial and last name may be mapped with just the last name. In another one of the examples above, the AOL domain is mapped to the AIM domain.

Mechanism 2

A second mechanism in CV calculation scheme 400A assesses the rarity of UIDs. The UIDs with similarities and certain level of rarity can also be compared and analyzed. Rarity may imply a unique name, username, or string of characters within a UID. Similarities of common names, such as "John Smith", within a UID may produce results with less confidence, versus similarities of unique names such as "Vivek Sodera". A table of common first and last names can be used to compare to the UID names. For example, the correlation system 100 may assess how many search results from a search engine produce similar names. If there are relatively few results from the name search, then that name may be identified as a relative unique name and be given a higher CV score when matched with similar names. If there are a large number of hits from the name search, that name may be identified as a relative common name and be given a lower CV score when matched with similar names. In another implementation, the correlation system may use empirical data that has previously documented common names. For example:

johnsmith (AIM screenname)=john.smith@companyA.com→low CV vivek.sodera@gmail.com=vivek.sodera@companyB.com→higher CV The CV Calculation Scheme 400B The CV calculation scheme 400B in FIG. 5 uses data associated with one UID and actively compares that to data associated with second UID in order to extract the similarities in the data and thereby linking the multiple UIDs together to the same entity.

Mechanism 1

A first mechanism in CV calculation scheme 400B searches multiple UIDs for the same profile on a given web site. Many web sites allow users to register multiple email addresses under a single UID (i.e. username, email address, etc.). These sites ensure that the user verifies his email addresses, thus all the email addresses associated with a particular UID or profile for a given site have a very high confidence of belonging to the same individual. Examples of these sites include Yelp, LinkedIn, Evite, and Facebook.

Many of these sites also allow users to search for other people by their UIDs and find a particular profile on that site. If two or more UIDs are searched and the resultant profile is the same, there is a high confidence that the two (or more) UIDs are linked to the same individual.

Figure 6:
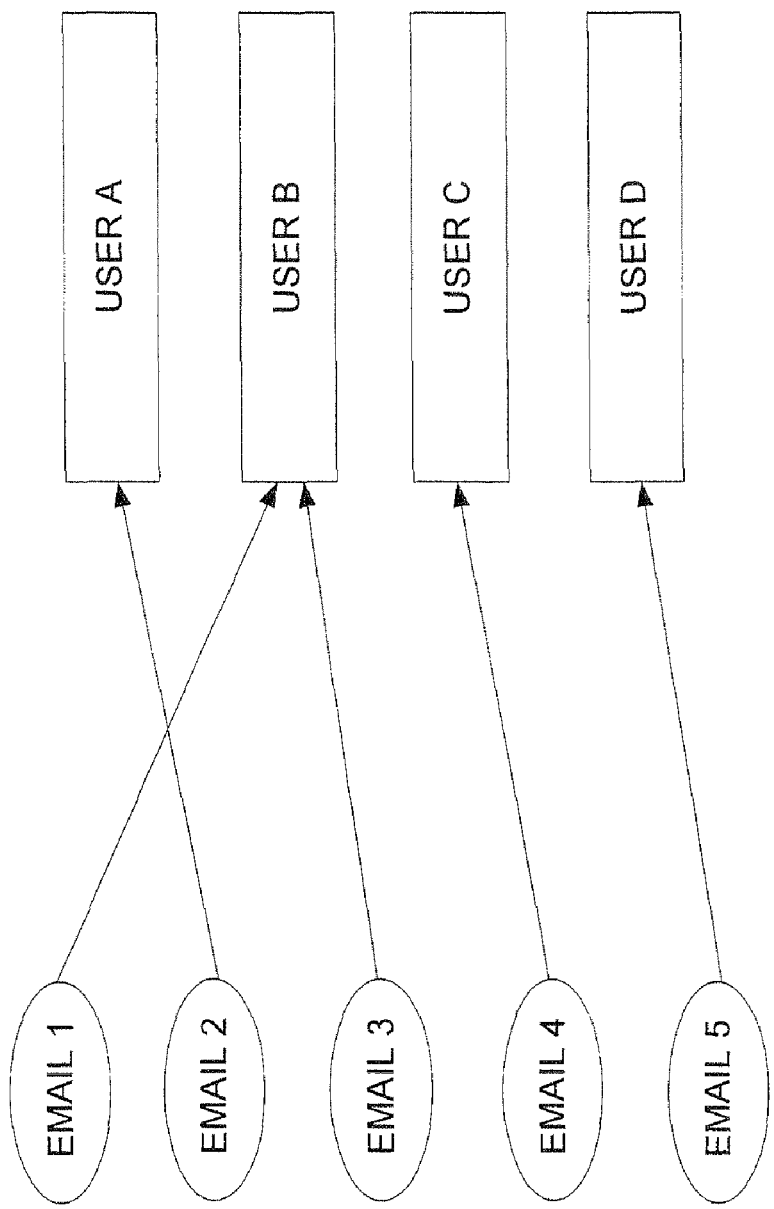
FIG. 6 shows how different email addresses can be associated with different users.

FIG. 6 shows that a member/friend search using Email1 and Email3 display the same profile (UserB) for a social networking/community site. This in turn implies that Email1 and Email3 are linked to the same individual.

Mechanism 2

Figure 7:
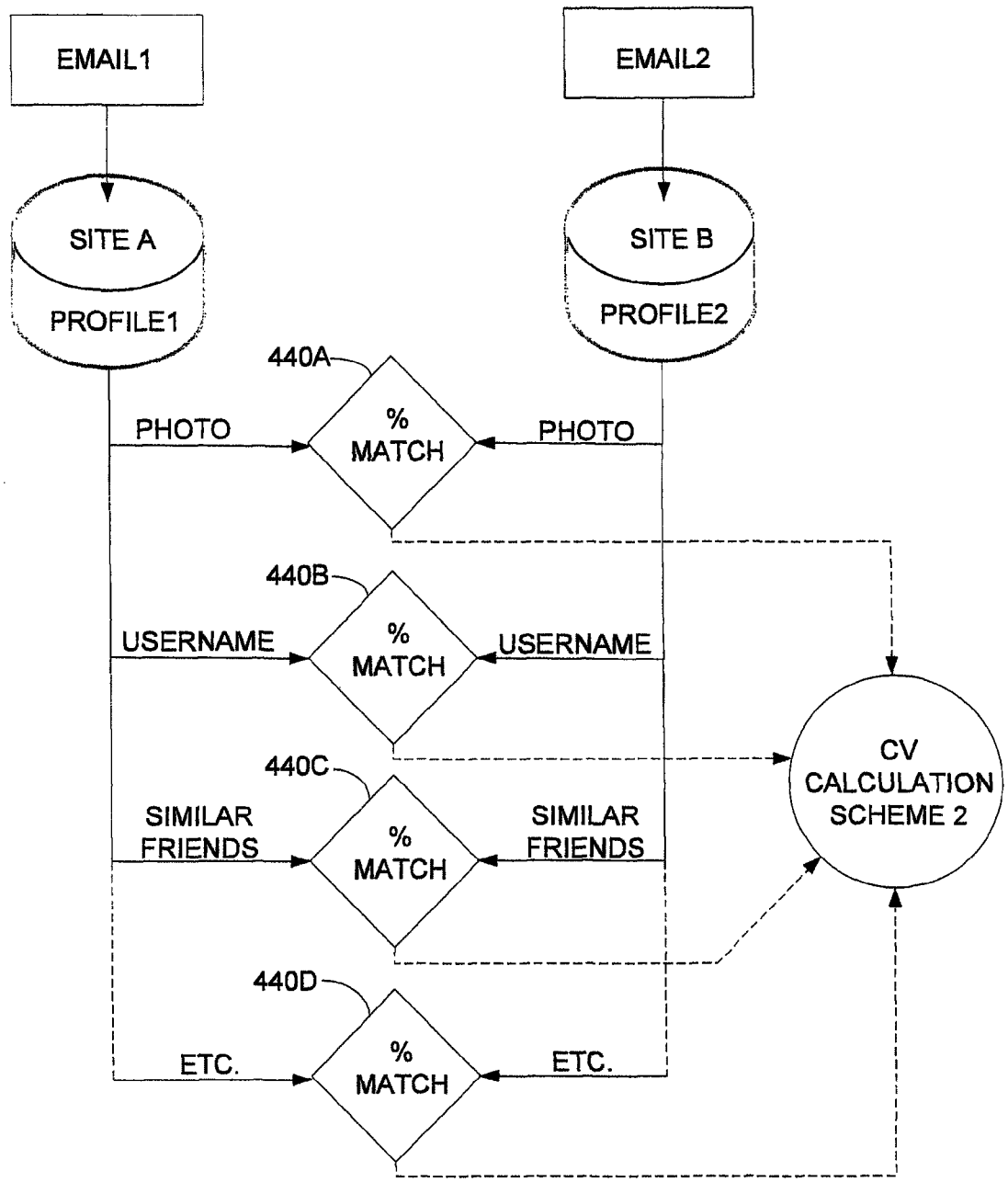
FIG. 7 shows how profile information from different sites is actively obtained and used to calculate a confidence score.

FIG. 7 displays the flow necessary to determine a confidence value for CV calculation scheme 400B in FIG. 5. Such comparisons between social network/communication sites include photos, username, name, location, interests, and key friends. An email address Email1 when searched on a social networking SITE A, may bring up Profile1 with a certain username, age, group of friends, and any other information. Another email address Email2 when searched on a social networking SITE B, may bring up Profile2 with a similar username, age, circle of friends, etc. In this case, a confidence level is assigned indicating that these two or more email addresses can be linked together to the same individual.

The photos in Profile1 are compared with the photos in Profile 2 in operation 440A to identify any matching photos. Similarly, operation 440B compares USERNAMEs in Profile1 with the USERNAMEs in Profile 2. Similar friend names can be compared in operation 440C and any other information can be compared in operation 440D.

Each criterion has a certain weight associated with it in determining the confidence score. For instance, the photo matching in operation 440A may weight more than interests matching performed in operation 440D or similar friend matching in operation 440C. The second mechanism in CV calculation scheme 400B determines when different profiles (Profile1 and Profile2) on different web sites (SITE A and SITE B), respectively, are likely to be for the same individual. If so, the different UIDs associated with these different profiles are linked to the same individual. For example, the CV calculation scheme 2 generates a CV value according to the percentage of matches and associated weights identified in operations 440A-440D.

Mechanism 3

Facial recognition software can be used to determine that two different pictures or sets of pictures on the profiles of two different websites belong to the same individual. This further determines that the different UIDs associated with these different profiles/pictures link to the same individual.

For example, members of social networking or photo hosting sites may use the same picture or similar pictures at multiple sites. The pictures may look slightly different (i.e. cropped or zoomed differently) or look entirely different. By performing image matching and facial recognition on images, the CV calculation scheme 400B can determine that Profile1 on SITE A may have a high likelihood of being the same person associated with Profile2 on SITE B.

Mechanism 4

A fourth mechanism gathers and compares information on a UID's web footprint. Most UIDs have a web footprint. In other words, while searching for UID1 on various web sites, an individual's self-reported age, self-reported location, verified location, blog comments, blog links (i.e. blogger friends), profile information, name, etc. may be obtained. Some of this information is obtained outside of conventional social networking sites. This information is compared with the information obtained for UID2.

Mechanism 5

A fifth mechanism gathers and compares UID information on email signatures. Many emails include a signature at the footer of an incoming email. The signature can include UIDs such as the email address (which may or may not match the "From" email address), phone numbers, IM accounts, accounts at multiple web sites, URLs, and more. The signature may also include identifiers such as the name of the person sending the email, an employer's name, address, slogan, legal notice, graphic, etc. Two or more emails with the exact or similar signatures may be associated with the same individual.

Mechanism 6

A sixth mechanism links the "from" email address and the "reply to" email address to the same individual. An email header includes a "from" email address and "reply-to" email address. If the "from" and "reply-to" email addresses are different, this may imply that the two email addresses belong to the same individual. An example of this is when someone receives an email from bill@companyA.us with a "reply-to" of bill@companyA.com. It could be assumed with some confidence that bill@companyA.us and bill@companyA.com are the same individual.

Often times the "from" and "reply-to" emails are different because the email is being sent by one person on behalf of another. This may be the case where an executive assistant responding to an email. The user correlation system thus may need to rely on the other aforementioned mechanisms in order to obtain a higher confidence level. In essence, mechanism 6 is a trigger for the other mechanisms.

An auxiliary embodiment is where someone may get an "on behalf of" between email addresses. An example in the "from" of the header: billj@gmail.com on behalf of bill@companyA.com. This implies there is a strong chance of a relationship between the two email addresses. The email addresses may be attached to either the same individual or between an individual and his assistant or have some other relationship.

The CV Calculation Scheme 400C

Figure 8:
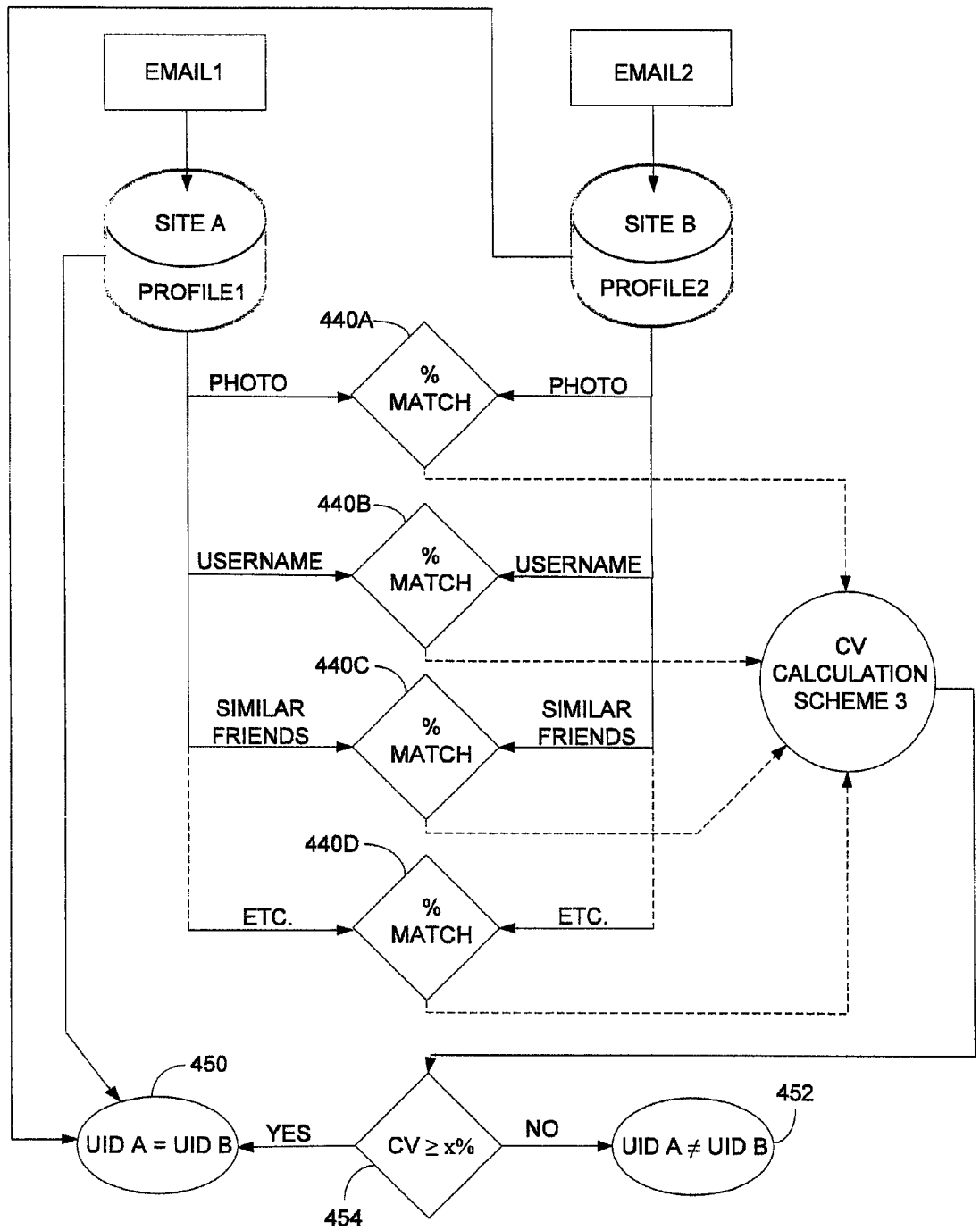
FIG. 8 shows how profile information from different sites is passively obtained and used to calculate a confidence score.

FIG. 8 shows CV calculation scheme 400C. Information is compared passively and if a match is found, the corresponding profiles where the information was obtained will be linked together. From there, the corresponding UIDs are linked. Rather than performing an active search of a UID, information is gathered and compared passively. If a set of information is matched, the corresponding profiles where the information was obtained will be linked together. If UIDs happen to be stored for the matched profiles, the UIDs are then linked together.

This passive method is the reverse process of the second and third mechanism in CV calculation scheme 400B. Information across different social networking sites and photos across social networking and photo hosting sites are compared and resulting matches will link profiles/accounts and corresponding UIDs (if the UIDs are stored).

If the CV value for the two profiles A and B are below a confidence threshold x % in operation 454, then the two UIDs A and B associated with profiles A and B, respectively are determined not to be for the same person in operation 452. If the CV value for the two profiles A and B are equal to or above the confidence threshold x % in operation 454, then the two UIDs A and B associated with profiles A and B, respectively are determined to be for the same person in operation 450.

The CV Calculation Scheme 400D

The CV calculation scheme 400D in FIG. 5 allows users to explicitly link and verify multiple email addresses. Users are allowed to proactively link multiple email addresses to their own identity. A platform will be created for users to submit multiple email addresses and verify that they own the email addresses they submit.

With some states requiring sex offenders to register their email address, a precedent may be set for government officials to link other information and other UIDs for the same sex offender. Such information can include name, US postal address, social security number, or any other pertinent information in order to monitor that individual.

The embodiments and aspects described and illustrated above are meant to be exemplary and illustrative, not limiting in scope. In various embodiments, one or more of the above-described problems have been reduced or eliminated, while other embodiments are directed to other improvements. As used herein, the term "embodiment" means an embodiment that serves to illustrate by way of example but not limitation.

It will be appreciated to those skilled in the art that the preceding examples and embodiments are exemplary and not limiting to the scope of the disclosure. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A user correlation system, comprising:
one or more processors configured to:
receive a unique identifier association request for unique identifiers;
identify a first website containing user activity information associated with a first one of the unique identifiers;
extract a first set of data from the user activity information on the first website associated with the first one of the unique identifiers;
identify a second website containing user activity information associated with a second one of the unique identifiers;
extract a second set of data from the user activity information on the second website associated with the second one of the unique identifiers;
search for similarities between the first set of data extracted from the user activity information on the first website and the second set of data extracted from the user activity information on the second website;
compare the first set of data extracted from the first website with the second set of data extracted from the second website; and
generate an association score that indicates a confidence factor that the first one of the unique identifiers and the second one of the unique identifiers are associated with a same user according to the comparison between the first set of data and the second set of data.

2. The user correlation system according to claim 1 wherein one or more of the processors are further configured to:
determine if a profile or account information exists on the first and second website associated with the unique identifiers;
extract data from the profile or account information on the first and second website; and
generate the association score according to the similarities in the data extracted from the profile or account information.

3. The user correlation system according to claim 2 wherein one or more of the processors are configured to operate as an information filter that extracts correlation information from the profile or account information.

4. The user correlation system according to claim 1 wherein one or more of the processors are further configured to return the association score to a client in response to receiving the unique identifier association request.

5. The user correlation system according to claim 1 wherein the first and second set of data each include a list of friends.

6. The user correlation system according to claim 1 wherein one or more of the processors are configured to operate as a user submission platform that link different unique identifiers with the same user.

7. A method comprising:
receiving, by a computing device, a unique identifier (UID) request for one or more user UIDs;
identifying, by the computing device, a website location containing online user information associated with the one or more user UIDs;
obtaining, by the computing device, the online user information from the website location associated with the one or more user UIDs;
comparing, by the computing device, the online user information from the website location with the personal information associated with the one or more user UIDs;
searching, by the computing device, for similarities between the online user information from the website location and personal information associated with the one or more user UIDs; and
generating, by the computing device, a UID association score based on similarities between the online user information obtained from the website location and the personal information associated with the one of more user UIDs, wherein the UID association score indicates a confidence level that the one or more user UIDs are associated with a particular person; and
returning the UID association score back to a client in response to the client sending the UID request.

8. The method according to claim 7 wherein the one or more user UIDs include a first and second UID, and wherein the method further comprises:
identifying user names and domain names in the first and second UID; and
deriving the UID association score according to similarities in the user names and similarities in the domain names in the first and second UID.

9. The method according to claim 8 further comprising:
varying the UID association score according to variations in domain name extensions in the first and second UID;
varying the UID association score according to domain names for the first and second UID; or
varying the UID association score according to domain extensions in the first and second UID that point to a same email account.

10. The method according to claim 7 further comprising adjusting the UID association score according to rarity of names in the one or more user UIDs.

11. The method according to claim 7 further comprising:
identifying email signatures associated with the one or more user UIDs, wherein the email signatures identify a name of a user sending the emails and are located in a footer of the emails;
comparing the email signatures; and
generating the UID association score according to the comparison of the email signatures.

12. The method according to claim 7 further comprising:
identifying "from", "reply to", or "on behalf of" email addresses for emails associated with a first and second one of the one or more user UIDs;
comparing the "from", "reply to", or "on behalf of" email addresses; and generating the UID association score according to the similarities of the "from", "reply to", or "on behalf of" email addresses associated with the first and second one of the one or more user UIDs.

13. The method according to claim 7 further comprising:
identifying user profiles or accounts on the website location and on an additional different website location;
comparing information identified in the user profiles or accounts; and
linking the user profiles or accounts on the website location and on the additional website location together when the information indicates the user profiles or accounts are associated with the particular person.

14. The method according to claim 13 further comprising:
identifying different UIDs in the user profiles or accounts; and
linking the different UIDs to the particular person according to the different UIDs identified in the user profiles or accounts.

15. The method according to claim 7 further comprising:
receiving user information from users manually identifying different UIDs associated with the particular person; and
generating the UID association score according to the user information.

16. A method comprising:
receiving, by a computing device, an association request for an association indicator between a first unique identifier (UID) and a second UID;
identifying, by the computing device, a first website associated with the first UID;
identifying, by the computing device, a second website associated with the second UID;
extracting, by a computing device, a first set of information from a first user profile on the first website associated with the first UID;
extracting, by a computing device, a second set of information from a second user profile on the second website associated with the second UID;
comparing, by the computing device, the first set of information with the second set of information;
search for similarities between the first set of information extracted from the first website with the second set of information extracted from the second website; and
generating, by the computing device, an association score to indicate a confidence factor the first UID and the second UID are associated with a same person according to the comparison of the first set of information with the second set of information.

17. The method according to claim 16 further comprising:
searching through an additional different website for additional information associated with the first or second UID;
comparing the information identified on the first and second website with the additional information identified on the additional website; and
adjusting the association score according to similarities between the information identified on the first and second website and the additional information identified on the additional website.

18. The method according to claim 16 wherein the first and second set of information includes—photos, circle of friends, usernames, and address information.

19. A computer device containing instructions that when executed by a computer result in:
receiving a unique identifier association request to determine a probability that two different unique identifiers (UIDs) are associated with a same person;
identifying data for the different UIDs from different online locations that associate the two different UIDs with actual persons;
search for similarities between the data for the different UIDs from the different online locations;
comparing the data for the two different UIDs from the different online locations;
identifying similarities and differences between the data for the two different UIDs from the different online locations;
generating an association score indicating the probability that the two different UIDs are associated with the same person according to the identified similarities and differences; and
returning the association score in response to the unique identifier association request indicating a confidence level that the two different UIDs are associated with the same person.

20. The computer device according to claim 19 further comprising instructions that when executed by the computer result in:
searching different profiles or accounts at the different online locations for the data associated with the two different UIDs;
filtering the data for personal information that may be associated with the same person; and
using the filtered data to generate the association score.

21. The computer device according to claim 20 further comprising instructions that when executed by the computer result in:
searching a database for a previously derived association score for the two different UIDs; and
searching the different online locations for the personal information when the database does not contain a previously derived association score.

22. The computer device according to claim 20 further comprising instructions that when executed by the computer result in:
identifying different types of personal information in the profiles or accounts that have previously been associated with high association scores; and
increasing weighting for the different types of personal information when deriving future association scores.

* * * * *